A. KYNSI.
HARROW.
APPLICATION FILED NOV. 30, 1915.

1,181,394. Patented May 2, 1916.

Witness

Inventor
August Kynsi
By
Attorney

UNITED STATES PATENT OFFICE.

AUGUST KYNSI, OF DEEP RIVER, WASHINGTON.

HARROW.

1,181,394.  Specification of Letters Patent. Patented May 2, 1916.

Application filed November 30, 1915. Serial No. 64,297.

*To all whom it may concern:*

Be it known that I, AUGUST KYNSI, a citizen of the United States, residing at Deep River, in the county of Wahkiakum, in the State of Washington, have invented a new and useful Harrow, of which the following is a specification.

This invention relates to drag harrows, cultivators and like agricultural implements, one of its objects being to provide an all-metal structure of this character having teeth of novel form combined therewith, the teeth being so shaped as to be easily and economically made, readily and easily affixed to the bars forming the frame of the harrow, and so shaped as to thoroughly turn up and cultivate the soil over which they are drawn.

With the foregoing and other objects in view, which will appear as the description proceeds, the invention resides in the combination and arrangement of parts and in the details of construction hereinafter described and claimed, it being understood that changes in the precise embodiment of the invention herein described can be made within the scope of what is claimed without departing from the spirit of the invention.

In the accompanying drawing, the preferred form of the invention has been shown.

Figure 1:
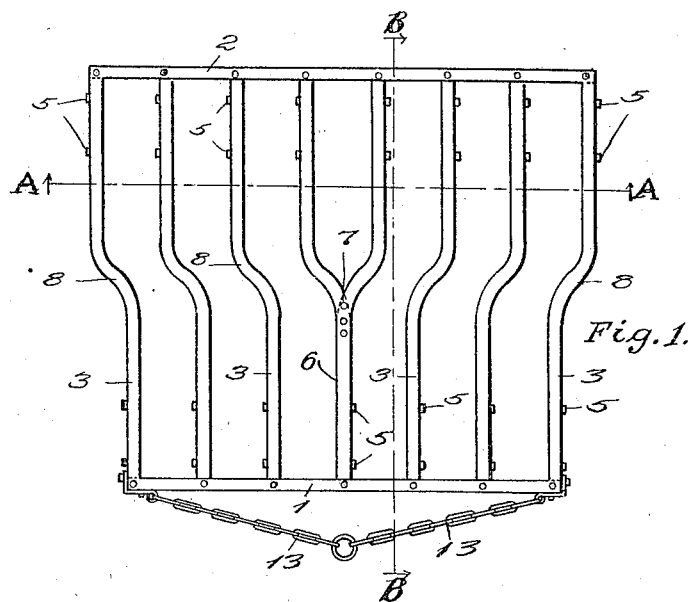
Figure 2:
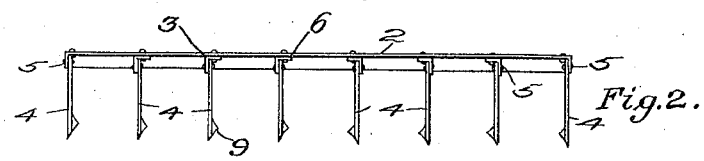
Figure 3:
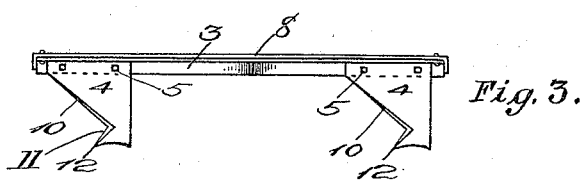
Figures 4, 5:
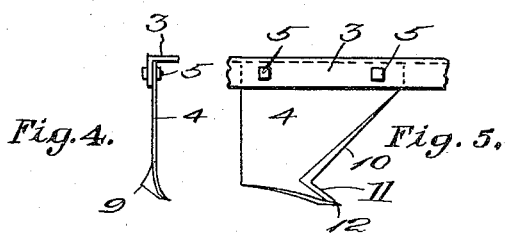

Figure 1 is plan view of my improved harrow; Fig. 2 is a sectional view of the same, taken on line A—A of Fig. 1, looking to the rear; Fig. 3 is a longitudinal sectional view of my harrow, taken on line B—B of Fig. 1, looking to the left, and showing the side view of the teeth and the manner of attaching them to the frame bars; Fig. 4 is a front view of one of the teeth, showing the flared heel of the tooth; Fig. 5 is a detail view of one of the teeth, showing the same attached to the frame bar, with a portion of said bar broken away.

For a more comprehensive understanding of my device, reference may be had to the reference characters of the drawings, in which—

Numerals 1 and 2 indicate the front and rear bars respectively of the frame, which are all made of angle iron set with one flat surface in the plane of the harrow, and extending inwardly, thereby providing a dependent flange on the outer edge of the harrow.

3 are the longitudinal bars of the frame, which are also made of angle iron and set with a flat surface extending toward the center of the harrow, thereby providing dependent flanges to which the teeth 4 are bolted as at 5.

6 is the center bar of the frame, which is also made of angle iron presenting one flat surface uppermost and is forked intermediate of its ends as at 7. The bars 3 are bent or shouldered intermediate their ends at 8, which construction insures the non-tracking of the teeth.

I provide a heel or flared portion 9 at the bottom and rear portion of the teeth 4, which in a measure turns up the soil like a plow and I form the teeth with a slanting front edge as at 10, with a beveled edge as at 11. I provide the teeth with a point 12, which has a tendency to keep them well set in the ground when the harrow is being operated.

13 is the draft chain.

Having thus described my invention, what I claim is:

1. The combination with an angle iron being forked intermediate its ends, of a plurality of angle irons bent intermediate their ends and lying on both sides of the first named angle iron, the ends of all said angle irons being bound by angle irons lying transversely thereof, all said bars being so arranged as to provide a dependent flange, with a plurality of teeth, said teeth being adapted to be fastened to said dependent flange.

2. The combination of an angle iron being forked intermediate its ends, with a plurality of angle irons bent outwardly intermediate their ends and lying on both sides of the first-named angle iron, the ends of all said angle irons being bound by angle irons lying transversely thereof and being so arranged as to provide a dependent flange with a plurality of teeth, said teeth being flared at their lower and rear portions and being bolted to the said dependent flanges.

3. The combination of an angle iron being forked intermediate its ends, of a plurality of angle irons bent outward intermediate their ends and lying on both sides of the first-named angle iron, the ends of all said angle irons being bound by angle irons and all of said angle irons being so arranged as to provide a dependent flange, a plurality of teeth, said teeth having a forwardly and downwardly extending point at their lower front portions.

In testimony whereof, I affix my signature in presence of two witnesses.

AUGUST KYNSI.

Witnesses:
JOHN H. LUNKINEN,
A. W. NORBLAD.

Copies of this patent may be obtained for five cents each, by addressing the "Commissioner of Patents, Washington, D. C."